US010001920B2

(12) United States Patent
Feigenbaum et al.

(10) Patent No.: US 10,001,920 B2
(45) Date of Patent: Jun. 19, 2018

(54) SYMBOL LISTS FOR GRAMMAR-DRIVEN DATA ENTRY

(75) Inventors: Lisa Feigenbaum, Bellevue, WA (US); Ernest Tong, Redmond, WA (US); Calvin Hsia, Redmond, WA (US); Jay Schmelzer, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1299 days.

(21) Appl. No.: 11/961,742

(22) Filed: Dec. 20, 2007

(65) Prior Publication Data

US 2009/0164935 A1    Jun. 25, 2009

(51) Int. Cl.
  G06F 3/048    (2013.01)
  G06F 3/0489   (2013.01)
  G06F 17/27    (2006.01)

(52) U.S. Cl.
  CPC ........ *G06F 3/04895* (2013.01); *G06F 17/276* (2013.01)

(58) Field of Classification Search
  USPC ......................................... 715/780
  See application file for complete search history.

(56) References Cited

U.S. PATENT DOCUMENTS

| | | | |
|---|---|---|---|
| 5,896,321 | A | 4/1999 | Miller et al. |
| 6,311,323 | B1 * | 10/2001 | Shulman et al. ............ 717/111 |
| 6,377,965 | B1 | 4/2002 | Hachamovitch et al. |
| 6,820,075 | B2 | 11/2004 | Shanahan et al. |
| 6,989,822 | B2 | 1/2006 | Pettiross et al. |
| RE39,326 | E | 10/2006 | Comer et al. |
| 7,149,970 | B1 | 12/2006 | Pratley et al. |
| 7,171,353 | B2 | 1/2007 | Trower, II et al. |
| 7,216,292 | B1 | 5/2007 | Snapper et al. |

(Continued)

OTHER PUBLICATIONS

"Pluggable, Iterative Type Checking for Dynamic Programming Languages" by Tristan Allwood(hereinafter Allwood) Published Jun. 13, 2006.*

(Continued)

*Primary Examiner* — Peiyong Weng
(74) *Attorney, Agent, or Firm* — Cooper Legal Group, LLC

(57) ABSTRACT

In a data entry environment constrained by a symbolic grammar, a data entry position in the data set may be amenable to the insertion of a subset of symbols in compliance with the grammar. Also, the grammar may or may not permit the insertion of a value of one or more types at the data entry position of the data set. In order to facilitate grammatically correct data entry, a symbol list may be presented that indicates the grammatically valid symbols for the symbolic context of the data entry position, as well as the validity of the insertion of a value at the data entry position. The symbol list may also permit the selection of a symbol list option, and may insert the selected symbol or value at the data entry position. Various symbol list option selection inputs may be associated with the symbol list options to facilitate and economize data entry, and the association may be adapted based on whether or not a value is permitted at the data entry position. Several variations of these techniques are discussed relating to the use of symbol lists in various data entry and grammar scenarios, the presentation of the symbol lists, and the user interaction with the symbol lists.

21 Claims, 9 Drawing Sheets

| Rule | Symbol | Expansion |
|---|---|---|
| Rule 1 | <expression> | <assignment> |
| Rule 2 | <expression> | <operation> |
| Rule 3 | <assignment> | <variable name> = <operation> |
| Rule 4 | <variable name> | alphabetic_character |
| Rule 5 | <variable name> | alphabetic_character<variable name> |
| Rule 6 | <assignment> | <function name> { <function operation> } |
| Rule 7 | <function name> | alphabetic_character |
| Rule 8 | <function name> | alphabetic_character<function name> |
| Rule 9 | <operation> | number |
| Rule 10 | <operation> | <variable name> |
| Rule 11 | <operation> | <operation> <operator> number |
| Rule 12 | <operation> | <operation> <operator> <variable name> |
| Rule 13 | <function operation> | <operation> |
| Rule 14 | <function operation> | param1 |
| Rule 15 | <function operation> | param2 |
| Rule 16 | <function operation> | <function operation> <operator> param1 |
| Rule 17 | <function operation> | <function operation> <operator> param2 |
| Rule 18 | <function operation> | <function operation> <operator> <operation> |
| Rule 19 | <operator> | plus |
| Rule 20 | <operator> | minus |
| Rule 21 | <operator> | multiply |
| Rule 22 | <operator> | divide |
| Rule 23 | <operator> | modulus |
| Rule 24 | <operator> | <function name> |

(56) References Cited

U.S. PATENT DOCUMENTS

2004/0153995 A1    8/2004    Polonovski
2005/0114779 A1*    5/2005    Griesmer ...................... 715/711
2005/0235207 A1*  10/2005    Albrecht et al. ............. 715/705
2006/0123341 A1    6/2006    Smirnov
2007/0038978 A1    2/2007    Meijer et al.
2007/0061753 A1*    3/2007    Ng et al. ....................... 715/816

OTHER PUBLICATIONS

"IntelliSense", pp. 5-12.
Chardon Alvin, "IntelliSense Support in Visual C++", http://msdn2.microsoft.com/en-us/library/ms379615(vs.80).aspx.
Simon St. Laurent, "Using Visual Studio .NET: IntelliSense and Debugging", Date: 2005, pp. 1-5.

\* cited by examiner

| Rule | Symbol | Expansion |
|---|---|---|
| Rule 1 | <expression> | <assignment> |
| Rule 2 | <expression> | <operation> |
| Rule 3 | <assignment> | <variable name> = <operation> |
| Rule 4 | <variable name> | alphabetic_character |
| Rule 5 | <variable name> | alphabetic_character<variable name> |
| Rule 6 | <assignment> | <function name> { <function operation> } |
| Rule 7 | <function name> | alphabetic_character |
| Rule 8 | <function name> | alphabetic_character<function name> |
| Rule 9 | <operation> | number |
| Rule 10 | <operation> | <variable name> |
| Rule 11 | <operation> | <operation> <operator> number |
| Rule 12 | <operation> | <operation> <operator> <variable name> |
| Rule 13 | <function operation> | <operation> |
| Rule 14 | <function operation> | param1 |
| Rule 15 | <function operation> | param2 |
| Rule 16 | <function operation> | <function operation> <operator> param1 |
| Rule 17 | <function operation> | <function operation> <operator> param2 |
| Rule 18 | <function operation> | <function operation> <operator> <operation> |
| Rule 19 | <operator> | plus |
| Rule 20 | <operator> | minus |
| Rule 21 | <operator> | multiply |
| Rule 22 | <operator> | divide |
| Rule 23 | <operator> | modulus |
| Rule 24 | <operator> | <function name> |

FIG. 1

| User Input | Rule | Evaluation | Result |
|---|---|---|---|
| 12 | | <expression> | |
| | Rule 2 | <operation> | |
| | Rule 9 | 12 | 12 |
| 12 plus 13 | | <expression> | |
| | Rule 2 | <operation> | |
| | Rule 11 | <operation> <operator> 13 | |
| | Rule 9 | 12 <operator> 13 | |
| | Rule 19 | 12 plus 13 | 25 |
| x = 12 | | <expression> | |
| | Rule 1 | <assignment> | |
| | Rule 3 | <variable name> = <operation> | |
| | Rule 4 | x = <operation> | |
| | Rule 9 | x = 12 | 12 |
| y = 1 2 | | <expression> | |
| | Rule 1 | <assignment> | |
| | Rule 3 | <variable name> = <operation> | |
| | No rule can be applied, because "1 2" cannot be evaluated as an operation | | ERROR |
| ab = x | | <expression> | |
| | Rule 1 | <assignment> | |
| | Rule 3 | <variable name> = <operation> | |
| | Rule 5 | a<variable name> = <operation> | |
| | Rule 4 | ab = <operation> | |
| | Rule 10 | ab = <variable name> | |
| | Rule 7 | ab = x | 12 |

FIG. 2A

32 — sumx { param1 plus param2 multiply x }

| | | <expression> | |
|---|---|---|---|
| | Rule 1 | <assignment> | |
| | Rule 6 | <function name> { <function operation> } | |
| | Rule 8 | s<function name> { <function operation> } | |
| | Rule 8 | su<function name> { <function operation> } | |
| | Rule 8 | sum<function name> { <function operation> } | |
| | Rule 7 | sumx { <function operation> } | |
| | Rule 18 | sumx { <function operation> <operator> <operation> } | |
| | Rule 17 | sumx { <function operation> <operator> param2 <operator> <operation> } | |
| | Rule 14 | sumx { param1 <operator> param2 <operator> <operation> } | |
| | Rule 19 | sumx { param1 plus param2 <operator> <operation> } | |
| | Rule 21 | sumx { param1 plus param2 multiply <operation> } | |
| | Rule 10 | sumx { param1 plus param2 multiply <variable name> } | |
| | Rule 4 | sumx { param1 plus param2 multiply x } | OK |

34 — y = 1 sumx 2

| | | <expression> | |
|---|---|---|---|
| | Rule 1 | <assignment> | |
| | Rule 3 | <variable name> = <operation> | |
| | Rule 4 | y = <operation> | |
| | Rule 11 | y = <operation> <operator> 2 | |
| | Rule 9 | y = 1 <operator> 2 | |
| | Rule 24 | y = 1 <function name> 2 | |
| | Rule 8 | y = 1 s<function name> 2 | |
| | Rule 8 | y = 1 su<function name> 2 | |
| | Rule 8 | y = 1 sum<function name> 2 | |
| | Rule 7 | y = 1 sumx 2 | 36 |

FIG. 2B

| z = y sumx x plus w | | |
|---|---|---|
| | | <expression> |
| | Rule 1 | <assignment> |
| | Rule 3 | <variable name> = <operation> |
| | Rule 4 | z = <operation> |
| | Rule 12 | z = <operation> <operator> <variable name> |
| | Rule 12 | z = <operation> <operator> <variable name> <operator> <variable name> |
| | Rule 10 | z = <variable name> <operator> <variable name> <operator> <variable name> <operator> <variable name> |
| | Rule 4 | z = y <operator> <variable name> <operator> <variable name> <operator> <variable name> |
| | Rule 24 | z = y <function name> <variable name> <operator> <variable name> <operator> <variable name> |
| | Rule 8 | z = y s<function name> <variable name> <operator> <variable name> <operator> <variable name> |
| | Rule 8 | z = y su<function name> <variable name> <operator> <variable name> <operator> <variable name> |
| | Rule 8 | z = y sum<function name> <variable name> <operator> <variable name> <operator> <variable name> |
| | Rule 7 | z = y sumx <variable name> <operator> <variable name> |
| | Rule 10 | z = y sumx x <operator> <variable name> |
| | Rule 19 | z = y sumx x plus <variable name> |
| | No rule can be applied, because "w" is not a known variable name | ERROR |

| Data Set | Grammatically Valid User Input | Example of Invalid Input |
|---|---|---|
| _ | A number beginning an operation (Rules 2 and 9) an alphabetic character contained by a variable name as an operator in an operation (Rules 2 and 10) An alphabetic character contained by a variable name assignment (Rules 1 and 3) An alphabetic character beginning | =_ |
| x = 12<br>y = _ | A number (Rules 3, 9, 11, and 12) An alphabetic character contained by a known variable name, such as x (Rules 4, 10, 11, and 12) | y = z_ (where z is not the beginning of any known variable name) |
| abc = 12<br>def = ab _ | A symbol terminator, but only if ab is a known variable name (Rules 1, 3, and 10) An operator, but only if ab is a known variable name (Rules 1, 3, 10, and 12) An alphabetic character contained by a known function name, but only if ab is a known variable nam | def = ab _ (where ab is not a known variable name) |
| x = 1 _ 3 | Basic operators: "plus", "minus", "multiply", "divide", "modulus" (Rules 19-23) An alphabetic character contained by a known function name (Rule 24) | x = 1 2_ 3 |
| x = 1 m_ 3 | Basic operators that begin with the letter "m": "minus", "multiply", "modulus" (Rules 19-23) An alphabetic character continuing a known function name that begins with the letter "m" (Rule 24) | x = 1 m _ 3 (where m is not a known function name) |

FIG. 3

```
         60
          ↘
         62
      ┌───────┐
      │ START │
      └───┬───┘
   64     │
          ▼
  ┌─────────────────────┐
  │ PRESENT SYMBOL LIST │
  │ HAVING SYMBOL LIST  │
  │ OPTIONS COMPRISING  │
  │ THE SYMBOL OPTIONS  │
  │ THAT ARE PERMITTED  │
  │ BY THE GRAMMAR AT   │
  │ THE DATA ENTRY      │
  │ POSITION, AND AT    │
  │ LEAST ONE VALUE     │
  │ OPTION WHERE A      │
  │ VALUE IS PERMITTED  │
  │ BY THE GRAMMAR AT   │
  │ THE DATA ENTRY      │
  │ POSITION            │
  └──────────┬──────────┘
   66        │
             ▼
         ┌───────┐
         │  END  │
         └───────┘
```

FIG. 4

| Data Set | Symbol List |
|---|---|
| x = 12<br>y = _ | Number<br>x |
| abc = 12<br>def = ab _ | ab c |
| x = 1 _ 3 | plus<br>minus<br>multiply<br>divide<br>modulus |
| x = 1 m_ 3 | m<u>inus</u><br>m<u>ultiply</u><br>m<u>odulus</u> |
| _ = 1 plus 2 | New Variable Name<br>New Function Name<br>Number |
| abc = 1 plus 2<br>def = abc multiply 8<br>ab_ = def plus 6 | ab_<br>ab c<br>New Variable Name |

FIG. 5

| Data Set | Symbol List | Symbolic Semantic |
|---|---|---|
| Public BaseClass {<br>    Public String strFunction() { .... }<br>} | | |
| Public Class _ <br>Public BaseClass {<br>    Public String strFunction() { .... }<br>} | New Class Name_ | Defines a new class of any name |
| Public Class SampleClass_ | SampleClass {<br>New Class Function Name {<br>SampleClass; | Defines a new class named *SampleClass*<br>Defines a new class of any name beginning with *SampleClass*<br>Defines a new class named *SampleClass* derived from a base class |
| Public BaseClass {<br>    Public String strFunction() { .... }<br>} | | |
| Public Class SampleClass : BaseClass {<br>    Public S_ | String<br>Short<br>Static<br>SampleClass | Defines a class member of type String<br>Defines a class member of type Short<br>Defines a static class member<br>Defines a constructor function |
| Public BaseClass {<br>    Public String strFunction() { .... }<br>} | | |
| Public Class SampleClass : BaseClass {<br>    Public String str_ | str_<br>string<br>New Class Member Name_<br>str (<br>strFunction<br>New Class Function Name ( | Defines a class member of type String named *str*<br>Defines a class member of type String named *string*<br>Defines a new class member of any name<br>Defines a new class member function named *str()* that returns type String<br>Defines a function overriding the base function *strFunction()*.<br>Defines a new class member function of any name beginning with *str* that returns type String |

| Menu Location | Speech Output | Input Option | Response |
|---|---|---|---|
| Main Menu | Welcome to the telephone weather service. To hear a general forecast, press or say "1". To hear a forecast for your area, press or say "2". | 1<br>2<br>[anything else] | General Forecast<br>Local Forecast<br>Main Menu Error |
| Main Menu Error | I'm sorry - that is not valid input. Please try again. | | Main Menu |
| General Forecast | Here is today's general weather forecast. At any time, press the pound key or say "Main Menu" to return to the main menu. Today's weather... | # or Main Menu<br>[anything else] | Main Menu<br>General Forecast Error |
| General Forecast Error | I'm sorry - that is not valid input. Please try again. | | General Forecast |
| Local Forecast | Please enter or say the zip code for your area, one digit at a time. If you make a mistake, press the star key or say "oops" to delete the last digit, or press the pound key or say "Main Menu" to return to the main menu. | # or Main Menu<br>0<br>1<br>2<br>... | Main Menu<br>Zip Code 0<br>Zip Code 1<br>Zip Code 2<br>... |
| Zip Code 0 | You have entered: 0.<br>This corresponds to: Maine, Vermont, Massachusetts, and New Jersey.<br>Continue inputting your zip code, or press the pound key to hear a weather forecast for this region. | # or Main Menu<br>0<br>1<br>2<br>...<br>* or Oops | Main Menu<br>Zip Code 00<br>Zip Code 01<br>Zip Code 02<br>...<br>Local Forecast |
| Zip Code 1 | You have entered: 1.<br>This corresponds to: New York.<br>Continue inputting your zip code, or press the pound key to hear a weather forecast for this region. | # or Main Menu<br>0<br>1<br>2<br>...<br>* or Oops | Main Menu<br>Zip Code 10<br>Zip Code 11<br>Zip Code 12<br>...<br>Local Forecast |
| Zip Code 2 | You have entered: 2.<br>This corresponds to: West Virginia, Virginia, North Carolina, and South Carolina.<br>Continue inputting your zip code, or press the pound key to hear a weather forecast for this region. | # or Main Menu<br>0<br>1<br>2<br>...<br>* or Oops | Main Menu<br>Zip Code 20<br>Zip Code 21<br>Zip Code 22<br>...<br>Local Forecast |
| Zip Code 10 | You have entered: 10.<br>This corresponds to: New York City.<br>Continue inputting your zip code, or press the pound key to hear a weather forecast for this region. | # or Main Menu<br>0<br>1<br>2<br>...<br>* or Oops | Main Menu<br>Zip Code 100<br>Zip Code 101<br>Zip Code 102<br>...<br>Zip Code 1 |
| Zip Code 11 | You have entered: 11.<br>This corresponds to: Long Island.<br>Continue inputting your zip code, or press the pound key to hear a weather forecast for this region. | # or Main Menu<br>0<br>1<br>2<br>...<br>* or Oops | Main Menu<br>Zip Code 110<br>Zip Code 111<br>Zip Code 112<br>...<br>Zip Code 1 |
| Zip Code 12 | You have entered: 12.<br>This corresponds to: Eastern New York.<br>Continue inputting your zip code, or press the pound key to hear a weather forecast for this region. | # or Main Menu<br>0<br>1<br>2<br>...<br>* or Oops | Main Menu<br>Zip Code 120<br>Zip Code 121<br>Zip Code 122<br>...<br>Zip Code 1 |

FIG. 9

SYMBOL LISTS FOR GRAMMAR-DRIVEN DATA ENTRY

BACKGROUND

Many forms of data entry environments have been devised in the context of a symbolic grammar that defines valid data entry in various contexts. For example, in a data entry environment comprising a programming environment for the entry of a data set comprising a program, the symbolic grammar may specify, at any particular data entry position in the data set comprising the program, the symbols that a user may input that are syntactically valid, i.e., that can be validly parsed by the machine intended to execute the program. As another example, a hierarchical menu system may be devised for a telephone-base service, where the data set comprises the set of menu options that the user has selected to reach a particular location (i.e., a data entry position) in the hierarchical menu. Such a hierarchical menu system may consider the current menu position as a data entry position in the hierarchical menu, and may accept user input (e.g., a telephone button press and/or a spoken word) that corresponds to a selection among the menu options that are valid for that data entry position in the hierarchical menu system.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

This disclosure presents a technique for facilitating user input in a data entry environment having a symbolic grammar by suggesting, for a particular data entry position, a list of symbols that comprise grammatically valid input for that data entry position. For example, in a text- and keyboard-driven data entry environment, when a user types some alphanumeric characters that corresponds to a portion of one or more valid symbols, a symbol list may be presented comprising options of symbols that contain the typed characters and that comprise valid input at the data entry position. Moreover, the symbol list options may be selected, e.g., by particular user input, to insert the valid symbol at the data entry position. This technique facilitates data entry in the data entry environment by economizing user input, and promotes the entry of grammatically correct symbols.

In some grammars utilized by data entry environments, the user may declare a value that is not yet known to the data entry environment. The user may associate the value with some form of data object, which may later be referenced by the user or the system for various purposes. As one example, in a programming environment, a user may declare a name for a data object, and may later refer to the data object based on its name. The name may often be of arbitrary length, and may be chosen by the user among many valid combinations of symbol units (e.g., among many valid combinations of alphanumeric characters.)

In these examples, the data entry environment may account for the grammatical validity (or invalidity) of user input at a particular data entry position comprising a new value. More specifically, the data entry environment may present to the user a symbol list that includes options for both the symbols that are grammatically valid at the data entry position and one or more values where a new value may be entered in compliance with the grammar. The symbol list may also include previously entered values that may be entered at the data entry position in compliance with the grammar.

A symbol list of this nature may also be configured to adapt the association of user input with the selection of symbols in the symbol list based on whether or not a value option is included in the symbol list. For example, where the grammar does not permit the entry of a value at the data entry position, the user input may be more strongly associated with the options of the symbol list; i.e., a larger set of the user's data entry may be associated with the symbol list to encourage the user to select a grammatically valid symbol for data entry. By contrast, where the data entry position permits the entry of a value that complies with the grammar, the user input may be less strongly associated with the options of the symbol list, such that the user may more freely input an arbitrary value. This adaptation may reduce the user's accidental selection of an option from the symbol list when the user intends to input a value, which may otherwise impede the user's entry of data in the data entry environment.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DESCRIPTION OF THE DRAWINGS

FIG. 1 is a table of rules comprising an exemplary mathematical grammar.

FIG. 2 is a table of user input and the parsings and results thereof according to the exemplary mathematical grammar of FIG. 1.

FIG. 3 is a table of data sets having data entry positions, the set of grammatically valid user input at the data entry positions according to the exemplary mathematical grammar of FIG. 1, and an example of invalid user input at the data entry positions according to the exemplary mathematical grammar of FIG. 1.

FIG. 4 is a flowchart illustration of an exemplary method of facilitating data entry at a data entry position in a data set within a data entry environment having a symbolic grammar.

FIG. 5 is a table of data sets having data entry positions and a symbol list comprising symbol list options representing valid user input according to the exemplary mathematical grammar of FIG. 1.

FIG. 8 is a table of data sets representing a portion of a program according to a programming language grammar, and a symbol list for the data entry position of each data set representing valid user input according to the programming language grammar.

FIG. 9 is a table illustrating an exemplary hierarchical menu system for a weather forecast service that presents voice-based symbol lists comprising symbol list options representing valid user input according to the grammar of the hierarchical menu system.

DETAILED DESCRIPTION

Figure 6:
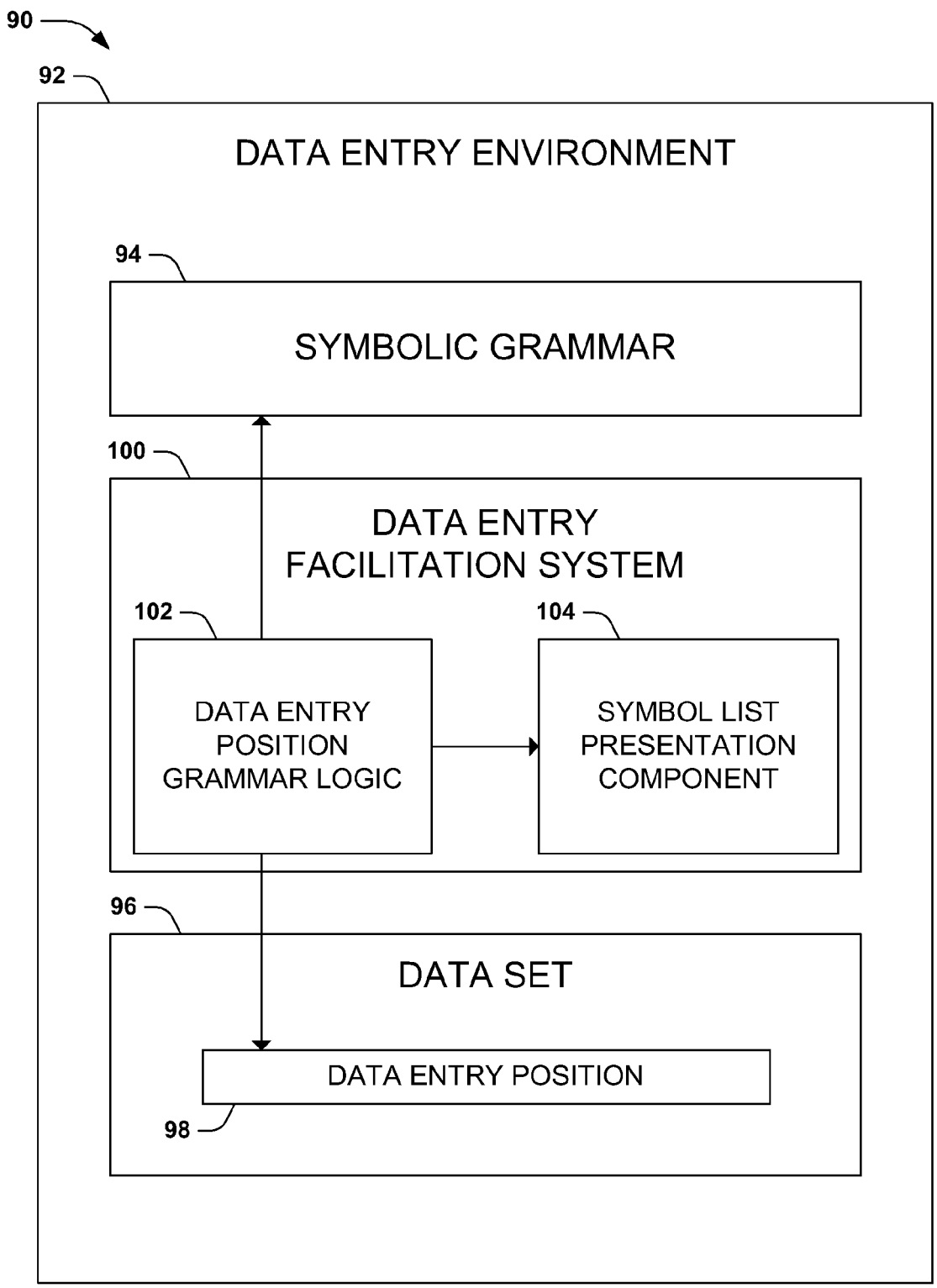
FIG. 6 is a component block diagram of an exemplary system for facilitating data entry at a data entry position in a data set within a data entry environment having a symbolic grammar.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

Many data entry environments have been devised to facilitate the entry of a data set based on a symbolic grammar. The symbolic grammar defines the valid and unambiguous syntax of a data set, such that the data set may be parsed in a regular and semantically unambiguous manner, e.g., by a computer system implementing a rules-based parser of the data set.

This disclosure may be better understood with an appreciation of the nature and an example of symbolic grammars. As one example, a simple mathematics grammar may be devised to facilitate the entry of simple mathematics statements of operators and assignment to be processed by a mathematical parsing algorithm. The grammar may permit the entry of a series of <expression> symbols, where each expression is either an assignment of a variable or function name to be executed, or is a mathematical operation to be computed and displayed. An operation may comprise, e.g., a simple number ("1"), or two numbers with an operator ("1 plus 2"), or a number with an operator and another operation ("1 plus" followed by another operation comprising "2 plus 3".) The grammar also permits the assignment of computed values to variables having alphabetic names, e.g., "x=1", or "y=2 plus 3". These variables may then be used in other expressions, e.g., an expression defined as the operation "x plus y". The operations may also be nested to produce long strings of operations, e.g., "x=1 plus" followed by operation "2 plus" followed by operation "3 plus 4," which is parsed as "x=1 plus 2 plus 3 plus 4".

The grammar may also permit the definition of new operators as functions that operate on two parameters (param1 and param2) passed to the function. Each function is declared as a name, followed by a function operation, which comprises some mathematical operations that may involve the parameters (param1 and param2) with which the function is used. For example, a new function may be called "mean" to compute the arithmetic mean of two parameters, $$\left(\text{i.e., } \frac{param1 + param2}{2}.\right)$$

This function may be defined according to the following grammar: "mean {param1 plus param2 divide 2}", which calculates the dividend of the sum of param1 and param2 by the number two. This function may then be used in later operations, e.g., "z=x mean y", which applies the mean function to the parameters x and y to compute the arithmetic mean, and, in this case, to assign the computed value to the variable named z.

According to this grammar, many forms of data entry may be provided that comprise grammatically valid input, which may be parsed in accordance with the grammar. For example, "y plus z minus 1" constitutes valid input (as long as y and z have previously assigned values), as does "w=x plus 1 minus y mean z" (as long as x, y, and z have previously assigned values, and the mean-function has been assigned as previously described.) Of course, many other forms of data entry may be provided that do not comprise grammatically valid input. For example, "x=2 3" does not comprise valid input because the expression does not define the operators to be applied to the numbers 1, 2, and 3 to compute a value to assign to variable x.

In order to determine the validity of user input (and to enable a computer system to parse the input), the grammar may be defined as a series of rules that may be applied in a regular manner to parse the user input in an orderly manner. FIG. 1 illustrates a set of rules 12 that comprise an exemplary mathematical grammar 10 for parsing the expressions described hereinabove. The exemplary mathematical grammar 10 comprises seven types of symbols:

<expression>, which defines a mathematical expression that may be provided as user input and computed to produce an output value;

<assignment>, which defines an operation to be computed and assigned to a named variable that may be subsequently referenced, or which defines a function that may subsequently used in an operation;

<variable name> and <function name>, which define the symbols that may make up a variable name or function name (i.e., an arbitrary-length string of alphabetic characters);

<operation>, which defines a mathematical function that evaluates to a value, and which may involve one or more operators;

<operator>, which defines several known mathematical operations (plus, minus, multiply, divide, etc.), and may also comprise a defined function; and <function operation>, which defines a mathematical function that may later be evaluated to a value, and may be based on two parameters passed into the function.

The rules 12 of the exemplary mathematical grammar 10 therefore specify that each symbol may be expanded (translated) as a symbol, a basic type, or a combination thereof. For example, the <operator> symbol may be expanded as one of the known mathematical operators, such as "plus", "minus", and "modulus", or as the <function name> symbol. Similarly, a <variable name> symbol may be expanded as a single alphabetic character (e.g., "x"), or as a single alphabetic character followed by a second <variable name> symbol, which may also be reduced into either a single alphabetic character or a single alphabetic character followed by a third <variable name> symbol, etc. By defining the <variable name> symbol in this manner, the exemplary mathematical grammar 10 specifies that a variable name may comprise one or more alphabetic characters (with no specified limit on the length of the variable name.)

The rules 12 of the exemplary mathematical grammar 10 of FIG. 1 may be applied in order to parse various forms of user input, where the input is decomposed into a set of symbols and basic values (e.g., numbers and alphabetic characters) that are specified in an order that can be regularly processed. If the parsing can decompose the input into such a set of symbols and basic values that are ordered in compliance with the grammar, then the input is grammatically correct and can be processed. However, if the parsing cannot decompose the input into a valid set of symbols and basic values, or if the symbols and basic values are specified in an order that does not comply with the grammar (e.g., "x=1 2 3"), then the input is grammatically incorrect and cannot be processed.

FIG. 2 illustrates the use of the rules 12 of the exemplary mathematical grammar 10 of FIG. 1 in order to parse some exemplary user input. For each exemplary user input, FIG. 2 illustrates some example parsings 20, whereby the rules 12 are applied to the user input to produce a grammatically valid expression and the results of the evaluation. In these example parsings 20, the parser attempts to parse the leftmost symbol that has not already been expanded to a basic type. For example, while parsing user input that has been expanded to "<operation><operator><variable name>", the parser looks at the <operation> symbol and attempts to expand it according to one of the rules 12 for parsing <operation> symbols. If a rule 12 may be applied to expand the <operation> symbol into a basic type, then the parser next attempts to expand the <operator> symbol. If a rule 12 applied to expand the <operation> symbol results in one or more additional symbols, then those are also parsed before the <operator> symbol. The parsing continues until all symbols have been expanded to basic types, in which case the parser outputs a value for a operation (e.g., "1 plus 2" outputs "3") or for an variable assignment (e.g., "x=2 multiply 4" outputs "8"), or until the parser arrives at an expanded user input to which no rules may be applied, in which case the parser outputs "ERROR". Other configurations of parsers are available that may have various advantages or reduce disadvantages with respect to this and other parser configurations, but the parser applied to the exemplary parsings 20 in the examples of FIG. 2 is devised to operate in this manner.

The exemplary parsings 20 are presented as if entered and processed in sequential order. This sequential order is relevant to the example presented in FIG. 2, because the assignment of a variable (e.g., "x=12" in the third exemplary parsing 26) denotes the acceptance of "x" as a valid variable name in subsequent parsings, such as "ab=x" in the fifth exemplary parsing 30. If the fifth exemplary parsing 30 were entered and parsed before the third exemplary parsing 26, then the parser does not recognize the variable name "x", and should output "ERROR" to indicate an invalid symbol name and expansion.

FIG. 2 presents many examples of such parsings that may provide a better understanding of the parsing of grammars. In the first example 22, the user simply provides the number 12 as input. The parser begins (in this and the other examples of FIG. 2) by presuming that the user input comprises an expression, since the exemplary mathematical grammar 10 of FIG. 1 is devised for the evaluation of such expressions.

In the first example 22 of FIG. 2, the parser applies Rule 2 to expand the expression into an operation symbol. This exemplary mathematical grammar 10 permits an operation to be expanded as a single value (according to Rule 9), or the value of a previously assigned variable (according to Rule 10), or a binomial mathematical operation having two operands and a mathematical operator (according to Rules 11 and 12.) The latter two rules further permit the specification of operations as operands in other operations, thereby permitting the nesting of operations, such as "(1 plus 2) plus 3". In this first example 22, the operation is expanded to a number according to Rule 9. Upon the application of Rule 9, the expression has been fully expanded to basic symbols and values, and may be mathematically evaluated; the parser therefore evaluates the expression and returns the number "12" as a result.

The second example 24 of FIG. 2 presents the evaluation of another expression that comprises a binomial operation. The parser applies the rules of the exemplary mathematical grammar 10 in stepwise fashion, first applying Rule 2 to expand the <expression> symbol as an <operation> symbol, and then expanding the <operation> symbol as a binomial operation having a numeric second operand (i.e., the number 13.) Of the two symbols in the expanded expression, the parser first evaluates the left symbol by expanding the first <operation> symbol as a numeric operand (i.e., the number 12.) The parser then expands the <operator> symbol to the known "plus" operator, which produces a fully expanded mathematical expression that the parser may evaluate with the mathematical result 25.

The fourth example 28 of FIG. 2 illustrates the attempted parsing of an expression that violates the exemplary mathematical grammar 10. The expression here provides the numbers "1 2" with no operator, and therefore fails to specify the mathematical relationship between the numeric operands as required by the exemplary mathematical grammar 10. The parser attempts to parse the expression by expanding the <expression> symbol into an <assignment> symbol according to Rule 1, and then by expanding the <assignment> symbol into a variable assignment according to Rule 3. However, the parser then fails to find a rule for expanding "1 2" as an operation. The parser therefore detects a violation of the grammar and outputs an "ERROR" result.

The sixth example 32 of FIG. 2 illustrates the parsing of an expression that includes a value in the form of a function name, comprising a string of alphabetic characters comprising the name "sumx". Rule 6 of the exemplary mathematical grammar 10 allows the input of a function name, and Rules 7 and 8 together specify that the function name may comprise an arbitrary-length (of at least length 1) string number of arbitrarily chosen alphabetic characters. These rules and the application to the sixth example 32 illustrate the acceptance of an arbitrary value in the expansion of a grammatical symbol. However, not every symbol may be expanded as a value; accordingly, only certain data entry positions in the expression may be amenable to the entry of a value in accordance with the grammar applied thereto.

The other examples of FIG. 2 illustrate other concepts in the application of the exemplary mathematical grammar 10 of FIG. 1 to various expressions. The examination of these examples may provide a better understanding of the nature of grammars, of the use of grammars for parsing regularly defined expressions, and of the value of providing a data entry environment constrained by a grammar for the preparation of grammatically correct data sets.

The techniques presented herein relate to the entry of user input at a data entry position in a data set within a data entry environment having a symbolic grammar. For example, the techniques may be applied to a mathematical data entry tool for processing mathematical expressions based on the exemplary grammar 10 of FIG. 1. In this example, the data set comprises a set of expressions that may subsequently be parsed by a mathematical expression parser. These techniques may be therefore applied to a mathematical expression editor that accepts user input defining the mathematical expression set, and are devised to facilitate the user in inputting a grammatically correct data set. These techniques may, but do not necessarily, apply to the parsing of such data sets, e.g., the evaluation of the expressions comprising the mathematical expression data set.

When the user provides user input, the data entry environment may insert the user input at a particular position in the data set. For example, a text-based data entry environment, such as a word processor or a text-messaging interface on a portable cellular device, may indicate the data set position with a cursor, and may insert text user input at the data set position indicated by the cursor. In the examples presented herein and the accompanying figures, the cursor and the data entry position are indicated by an underscore character (_)

For data sets constrained by a grammar—e.g., a data set comprising mathematical expressions defined in compliance with the exemplary mathematical grammar 10 of FIG. 1—a particular data entry position in a particular data set may be restricted by the grammar to a subset of the available forms of user input. FIG. 3 illustrates an example set 40 comprising some examples of data entry positions in various data sets representing mathematical expressions that are constrained by the exemplary mathematical grammar 10 of FIG. 1. In each data set of the example set 40 of FIG. 3, the user is entering some text at the data entry position indicated by the cursor (the underscore character.) The exemplary mathematical grammar 12 of FIG. 1 constrains each data set by limiting the input that the user may provide at the data entry position to produce a grammatically correct expression.

In the first example 42 of FIG. 3, the data set is empty, because the user has not yet inserted any text, and the data entry position is set to the beginning of an expression. According to the exemplary mathematical grammar 12, the user may begin an expression by typing a digit comprising a number, which will be evaluated by itself or as the first operator in an expression; or by typing an alphabetic character as the beginning of a variable name to be used as the first operand in an operation or in a variable assignment; or by typing an alphabetic character as the beginning of a function name to be defined in a function assignment. While most user input falls within one of these rules, the user may not input an "=" character, because an expression beginning with an "=" character cannot be properly parsed according to any rule: variable and function names may not contain an "=" character (as it is not alphabetic), and "=" cannot define a number.

In the second example 44 of FIG. 3, the user has previously entered an expression comprising an assignment of variable x, and is entering an expression comprising an assignment variable y. The input that the user may insert at the data entry position includes any number, either as a single number to which y will be assigned or as the first operand in an operation, or the first letter of the name of any known variable, such as x. However, the user may not enter a z if no known variable has a name including the letter z. It will be appreciated that the symbolic context of the second example 44 differs from the symbolic context of the first example of FIG. 3; i.e., the symbols accepted at the data entry position in the second example 44 are different from the symbols accepted at the data entry position in the first example 42 due to the different symbols already created in the data set, and in the vicinity of the data entry position.

Similarly, in the third example 46 of FIG. 3, the user has begun typing ab in an assignment expression to variable def, after having already entered an expression assigning a number to variable abc. The only valid input at this data entry position is the rest of a name of a variable or function that has previously been defined and includes ab. In this third example 46, the only valid input (other than deleting one or more characters), in view of the rest of the data set, is the letter c. Even inserting a symbol terminator character, such as a whitespace character (e.g., a space, a tab, or a carriage return), may be grammatically invalid, because the data set then contains a reference to an undefined variable named "ab".

The fourth example 48 and the fifth example 50 together illustrate one aspect of the symbol lists that may vary among implementations of the techniques presented herein. This aspect relates to a per-symbol vs. per-character view of the data entry position. In one variation, the data entry position may be evaluated on a per-symbol basis, such that the grammar is assessed for the symbols that may be validly inserted at the data entry position in accordance with the grammar. In this variation, the user input (e.g., characters inserted at the data entry position) may not change the assessment of the symbols that are appropriate for the per-symbol position, i.e., the set of symbols that may be used to complete or replace any characters that have been entered for the data entry position. Thus, in the fourth example 48, the data entry position is located between two numeric operands, and the user may input any basic operator or the name of a known function. Even if the user begins typing a symbol (e.g., "pl_"), although the operator "plus" might be used to complete this symbol entry (and may be suggested by the symbol list), the other valid operators or names of known functions may also be suggested to replace the "pl" characters that have been entered at the data entry position.

In another variation, the characters that already exist at the data entry position may be considered in preparing the symbol list, such that only symbols that in some way match these characters are included. For example, if in the fourth example 48 the user inputs an "m" character, then this may be considered a different data entry position, and the symbol list may be reevaluated to suggest symbols that account for the letter "m" (and, if permitted by the grammar at the data entry position, one or more values that also account for the letter "m".) Accordingly, the computer system may present a new symbol list comprising the set of valid user input to the basic operators that contain "m" (minus, multiply, and modulus) and to function names containing "m". In this manner, the set of grammatically correct options at the data entry position, as evaluated on a per-character basis, may be affected by the previous user input for the current symbol as well as the symbolic context of the data entry position. It may be appreciated that, while some of the examples discussed and illustrated herein may involve a per-character variation of these techniques, both the per-symbol and per-character variations of these techniques may be compatible with many aspects and variations of the techniques presented herein.

One potential refinement of a per-character view of the data insertion position relates to the manner of selecting symbols to match characters that already exist at the data entry position. In one simple variation, the techniques may suggest for a data entry position the symbols that begin with the entered characters (e.g., as illustrated in the fourth example 48, the entry of an "m" character may result in the generation of a symbol list containing symbols beginning with the letter "m".) However, other variations are possible. Alternatively or additionally, the symbol list may contain (e.g.) the symbols that end with the entered characters, e.g., entering the letter "s" may suggest "plus", "minus", and "modulus". Another variation of this aspect may include symbols that simply contain the entered letters (e.g., "ms" might match both "minus" and "modulus".) While many of the examples presented herein involve symbol lists having symbols that begin with entered characters, it will be appreciated that many variations in the selection of symbols to match some characters entered at the data entry position may be devised, and may be compatible with the aspects and variations of the techniques presented herein.

The examples of FIG. 3 illustrate some data entry positions in various data sets where grammatically valid subsets of user input may be identified from the set of all possible user input. For example, based on the grammar, the symbols that may be inserted at the data entry position, in compliance with the grammar, may be suggested to the user. A data entry environment provided to allow users to create such data sets may therefore facilitate user input by presenting the user with a symbol list comprising symbols permitted by the grammar at the data entry position. However, some grammars occasionally permit the entry of an arbitrary value, such as an alphabetic name of a variable, such as defining the name of a variable or function in the exemplary mathematical grammar 10 of FIG. 1. The valid set of user input may therefore include the range of values that the user may enter for some data entry positions (e.g., at the beginning of an expression for a variable definition or function definition in the exemplary mathematical grammar 10 of FIG. 1), and may include only previously defined values for other data entry positions (e.g., previously defined variable names as operands in an operation in the exemplary mathematical grammar 10 of FIG. 1), and may include no values for still other data entry positions (e.g., after typing a new symbol name and a whitespace character in the exemplary mathematical grammar 10 of FIG. 1, the user may only input an "=" character for a variable assignment, or a "{" character to begin a function definition.)

In accordance with the variable set of grammatically correct user input, a data entry environment may facilitate the entry of grammatically correct user input at a data entry position in a data set according to various techniques. The data entry environment may prepare and present for the user a symbol list that represents valid user input for a data entry position in a data set. The symbol list may include the symbols (e.g., keywords and previously declared names) that may be inserted at the data entry position in accordance with the grammar, and, where the grammar permits the insertion of a value, at least one value option to indicate at least some of the acceptable values that may be validly inserted at the data entry position. It will be appreciated that "value" may refer, inter alia, to a new symbol being defined and/or a literal value (e.g., "hi", 3.14159, 3402.5, etc.) Many variations of these techniques may also be devised that present additional advantages and/or reduce disadvantages with respect to other variations of these and other techniques.

Many embodiments may be formulated that advantageously incorporate these techniques within a user input interface. FIG. 4 illustrates one such embodiment comprising an exemplary method 60 of facilitating data entry at a data entry position in a data set within a data entry environment having a symbolic grammar. The exemplary method 60 begins at 62 and involves presenting a symbol list comprising the symbol list options that are permitted by the grammar at the data entry position, and at least one value option in data entry positions where a value is permitted by the grammar 64. By presenting the user with such a symbol list, the data entry environment may indicate for the user the set of grammatically correct user input that may be inserted at the data entry position. The exemplary method 60 thereby facilitates grammatically correct data entry, and therefore ends at 66.

FIG. 5 illustrates an exemplary symbol list set 70 for some data entry positions in various data entry sets, where the symbol lists present options for user input at the data entry position that are in compliance with the exemplary mathematical grammar 10 of FIG. 1. The first exemplary symbol list 72 corresponds to the third example 44 of FIG. 3, wherein the data entry position is located in an assignment to variable y, and the valid input options include a number and a name of a previously defined variable, such as x. It may be appreciated that the grammar permits the user to insert any number at this data entry position, and the symbol list accordingly indicates that a numeric value may be entered. By contrast, x represents a specific symbol that may be validly entered, and the symbol list indicates the input that the user may provide to specify this symbol.

The second exemplary symbol list 74 corresponds to the third example 46 of FIG. 3, in which the user is typing an assignment comprising a variable name. The second exemplary symbol list 74 therefore presents the single grammatically valid symbol that may be inserted at this data entry position—i.e., the symbol abc. This second exemplary symbol list 74 does not indicate that number values and/or new variable or function name values may be inserted at this data entry position, because such input is not valid according to the exemplary mathematical grammar 10 of FIG. 1. Moreover, in this second exemplary symbol list 74, the input that the user may provide to specify the remainder of the symbol is underlined; e.g., the user must input a c character to reference the variable named abc.

The third exemplary symbol list 76 and the fourth exemplary symbol list 78 correspond respectively to the fourth example 48 and the fifth example 50 of FIG. 3, and again illustrate a refinement of the symbol list based on characters that exist at the data entry position, where the symbols permitted by the grammar are evaluated with a per-character evaluation of the data entry position. It may again be appreciated that the fourth exemplary symbol list 78 presents a refined set of symbol list options as compared with the third exemplary symbol list 76, due to the user input of the letter "m", which restricts the valid symbols to those containing the letter "m". The data entry environment may allow the user to delete the "m" from the fifth example 50 of FIG. 3, thereby expanding the number of valid symbols to those of the fourth example 48 of FIG. 3 and displaying the correspondingly expanded third exemplary symbol list 76 of FIG. 5.

The sixth exemplary symbol list 82 of FIG. 5 is presented with respect to a data entry position as an assignment. In this symbolic context, several symbols may comprise valid input. First, the user may be assigning a new variable named with the characters already entered, i.e., a new variable named ab. This option is represented in the sixth exemplary symbol list 82 as "ab_", indicating that the currently entered symbol is grammatically valid. Second, the user may be in the process of assigning a new value to the previously assigned variable abc; accordingly, the sixth exemplary symbol list 82 includes a symbol list option "abc", indicating that simply typing a c character will complete this grammatically correct symbol reference. Third, the user may be in the process of entering a new variable name, such as "abx"; accordingly, the sixth exemplary symbol list 82 indicates that any new variable name may be entered at this data entry position.

FIG. 6 illustrates another example 90 featuring an embodiment of these techniques, comprising an exemplary system 100 for facilitating data entry. The exemplary system 100 may be included in a data entry environment 92 implemented to accept user input in accordance with a symbolic grammar 94 for the creation of a data set 96. The data entry environment 92 may define a data entry position 98 within the data set 96 where user input is to be inserted. The exemplary system 100 comprises a data entry position grammar logic 102, which is configured to identify symbols permitted by the symbolic grammar 94 at the data entry position 98, and to determine whether a value is permitted by the symbolic grammar 94 at the data entry position 98. The exemplary system 100 also comprises a symbol list presentation component 104 that is configured to present to the user a symbol list based on the determination of the data entry position grammar logic 102. The symbol list presentation component 104 therefore presents to the user a symbol list comprising the symbol list options permitted by the symbolic 102 grammar at the data entry position 98 as determined by the data entry grammar analysis component 102, and at least one value option where a value is permitted by the grammar 94 at the data entry position 98 as determined by the data entry grammar analysis component 102. By presenting a symbol list denoting valid input symbols at the data entry position 98 in the data set 96, the data entry facilitation system 100 facilitates the input of grammatically valid user input.

Figure 7:
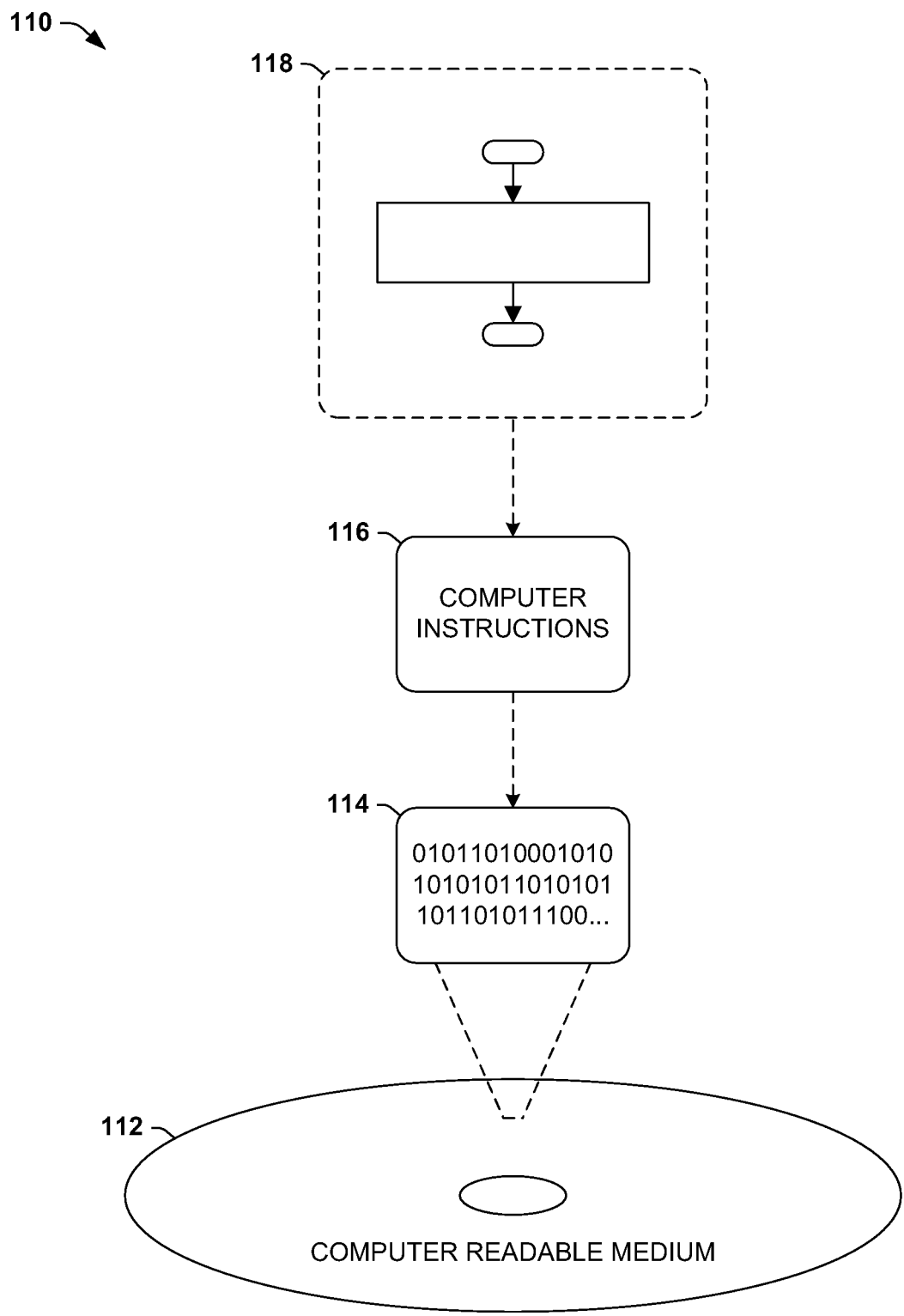
FIG. 7 is an illustration of an exemplary computer-readable medium comprising processor-executable instructions configured to embody a method of facilitating data entry at a data entry position in a data set within a data entry environment having a symbolic grammar.

Still another embodiment involves a computer-readable medium comprising processor-executable instructions configured to apply the techniques presented herein. An exemplary computer-readable medium that may be devised in these ways is illustrated in FIG. 7, wherein the embodiment 110 comprises a computer-readable medium 112 (e.g., a CD-R, DVD-R, or a platter of a hard disk drive), on which is encoded computer-readable data 114. This computer-readable data 114 in turn comprises a set of computer instructions 116 configured to operate according to the principles set forth herein. In one such embodiment, such as the embodiment 110 shown in FIG. 7, the processor-executable instructions 116 may be configured to perform a method of facilitating data entry at a data entry position in a data set within a data entry environment having a symbolic grammar, such as the exemplary method 60 of FIG. 4. In another such embodiment, the processor-executable instructions 116 may be configured to implement a system for facilitating data entry at a data position in a data set within a data entry environment having a symbolic grammar, such as the exemplary system 100 of FIG. 6. Many such computer-readable media may be devised by those of ordinary skill in the art that are configured to operate in accordance with the techniques presented herein.

Many aspects of these techniques may be implemented in various manners, which may provide additional advantages and/or reduce disadvantages with respect to other variations of these and other techniques. One variable aspect of the techniques presented herein is the formulation of the symbol lists and the grammars for various scenarios, which may be based on various user applications, input mechanisms, and output mechanisms. One such scenario is depicted in FIGS. 2, 3, and 5, comprising a data entry environment for inputting a data set comprising mathematical expressions. The data entry environment is constrained by the exemplary mathematical grammar 10 illustrated in FIG. 1, and the symbol lists presented in accordance with these techniques indicate the grammatically valid symbols and, where grammatically valid, the values that may be inserted at a data entry position in a data set.

Another scenario is depicted in FIG. 8, comprising an exemplary data entry environment 120 for a programming language. It may be appreciated that the language presented in this exemplary data entry environment 120 is not intended to represent any particular programming language, but merely depicts an exemplary programming language to which these techniques may be applied in facilitating data entry in compliance with a symbolic grammar defined by any such programming language. The examples presented in this exemplary data entry environment 120 comprise symbol lists that may be provided at various data entry positions upon successive sets of user input; e.g., the second example 124 illustrates the data set after some user input is inserted at the data entry position of the first example 122. The example of FIG. 8 also indicates, for a better understanding of the example, the semantics associated with the symbol list options in the symbol list.

In the first example 122 within the exemplary data entry environment 120 of FIG. 8, the user is in the process of defining a new class. At this data entry position, the grammar associated with the programming language only permits the user to enter a new class name. The symbol list for the first example 122 therefore indicates (only) that a new class name may be entered at this data entry position.

In the second example 124 within the exemplary data entry environment 120 of FIG. 8, the user has entered some characters that may define a grammatically valid name for the new class comprising the word SampleClass. The symbol list therefore indicates that the user may so name the new class as SampleClass by beginning to define the class, e.g., by entering a left curly brace. Alternatively, the grammar permits the user to enter additional characters that define an extended class name, such as SampleClass1 or SampleClassForMyProject; accordingly, the symbol list indicates that additional characters may be inputted to define any such class name. As another alternative, the grammar permits the user to enter a colon character to identify that the class derives from a base class of a certain name. Because the grammar for the programming language defines both a set of grammatically valid symbols (e.g., the left-curly-brace operator and the colon operator) and the input of a value (e.g., the name of the new class) at this data entry position, the symbol list includes both symbol list options and at least one value option. In this case, two value options are presented: one for the currently inputted class name SampleClass, and one for any class name beginning with SampleClass.

The third example 126 presents a data entry position in the data set in which the user has defined the SampleClass class and specified it as deriving from the base class BaseClass. The user is now inputting a public class member beginning with the letter S. The symbol list therefore presents several symbols that comprise grammatically valid input at this data entry position: a few basic variable types beginning with the letter S (String, Short), an additional class member modifier beginning with the letter S (Static), and a symbol representing a constructor function having the same name as the class (Sample Class.) In this third example 126, the grammar for the programming language does not define the valid input of a any value for this data entry position, including those beginning with the letter S, so the symbol list for this third example 126 does not specify values that may be entered in accordance with the grammar for the programming language.

The fourth example 128 again presents a symbol list comprising both grammatically valid symbol list options and grammatically valid value options. At this data entry position, the user is inputting a class member beginning with the letters str, which may either comprise a member field of type String or a member function that returns an object of type String. At this data entry position, the grammar permits the entry of the name of a function from the base class that may be overridden in this derived class, such as strFunctiono. Accordingly, the symbol list for this fourth example 128 includes a variety of symbol list options (e.g., strFunction( ) and a left-parenthesis to define the beginning of a member function named str( )) and value options (e.g., a member string names str, a member string having any name beginning with str, etc.)

The data entry environments to which these techniques may be applied are not limited to text input and textual grammars, and the presentation of the symbol lists is not limited to text symbols. FIG. 9 presents an exemplary scenario 130 in which these techniques may be applied comprising a speech-based menu system for providing weather forecasts, which may be implemented over a telephone interface. This exemplary scenario 130 comprises a weather service devised as hierarchical menu system that permits a user to navigate within the menu system either by dialing numbers on a telephone keypad or by speaking numbers or options. The exemplary scenario 130 also allows, at certain data entry positions in the data set (comprising the selection of user options that has led to the current position in the menu hierarchy), the input of a zip code or portion thereof to request a weather forecast localized to a particular region. For example, a user may input a full zip code (e.g., 10001) to receive a weather forecast localized to downtown New York City, or may input only a portion of a zip code (e.g., 10) for a weather forecast localized to a broader region of New York City. This exemplary scenario 130 of FIG. 9 therefore defines a grammar for utilizing the hierarchical menu system, wherein certain data entry positions within the data set may comprise symbols (e.g., "press the pound key or say 'Main Menu' to return to the Main Menu"), values (e.g., "enter all or part of a zip code"), or both. The telephone-based interface may therefore present to the user a symbol list defining grammatically valid input at the current data entry position, and such symbol list may include both one or more symbol list options and, where grammatically valid, a value option. The telephone-based interface therefore facilitates grammatically valid user input in the context of the data entry position within the hierarchical menu by implementing the techniques described herein. Moreover, the telephone-based interface provides an audible symbol list, such as may be generated by a speech synthesis component, and operates on user input comprising recognized speech symbols and values. Other uses of symbol lists in various, grammatically constrained data entry environments may be devised by those of ordinary skill in the art that embody the techniques described herein.

Another aspect that may be variously implemented among different embodiments relates to the interactivity of the symbol list in response to user input. Several such variations are presented and discussed, but those of ordinary skill in the art may be able to devise many variations in the interactivity of the symbol lists while implementing the techniques described herein.

As one variation, the symbol list may be statically presented to the user to indicate the symbol list options and value options that comprise grammatically valid input for the data entry position in the data set. While the symbol list may not intercede in the entry of data in the data set, its presentation may nevertheless serve as a cue as to the symbols and values that are grammatically permitted in the symbolic context of the data entry position in the data set.

As a second variation, the symbol list may interact with the user by permitting a user selection of a symbol list option. For example, a symbol list displayed on a computer screen may permit the user to click on a symbol list option, and may insert the symbol or value associated with the selected symbol list option at the data entry position. As another example, the symbol list may allow the user to cursor up and down among the symbol list options within the symbol list (e.g., by using up arrow and down arrow keys), and to select a symbol list option for insertion at the data entry position by pressing the enter key. This insertion may be performed as part of a method embodying these techniques, e.g., as an additional element of the exemplary method 60 of FIG. 4. Alternatively, the insertion may be performed by a system implemented according to these techniques, e.g., by including in such a system (such as the exemplary system 90 of FIG. 6) an input processor component configured to detect user input representing a user selection of a symbol list option, and a data entry insertion component configured to insert the selected symbol list option detected by the input processor component at the data entry position.

As a third variation (which may be implemented alone or in conjunction with the other variations), the data entry environment may be configured to detect user input that does not represent a selection of a symbol list option, e.g., further alphanumeric characters that do not correspond to a symbol list option. This variation relates to embodiments of these techniques involving a per-character evaluation of the data entry position (i.e., one that attempts to suggest symbols permitted by the grammar that match the characters already existing at the data entry position.) In such embodiments, upon detecting such user input, the data entry environment may insert the user input into the symbol list at the data entry position to form a second data entry position, and may then present a second symbol list pertaining to the new data entry position, and comprising the symbol options permitted by the grammar at the second data entry position, and at least one value option where a value is permitted by the grammar at the second data entry position. The data entry environment may therefore permit the user to continue providing user input where the intended user input does not directly correspond to a symbol list option (but is allowed by the grammar), and may respond by updating the symbol list according to the new data entry position.

As a fourth variation (which may be implemented alone or in conjunction with the other variations), at least one symbol list option may be associated with at least one symbol list option selection input. The symbol list option selection input comprises user input representing a user selection of a symbol list option in the symbol list for insertion at the data entry position. Whereas the second variation described hereinabove provides user interaction with the symbol list as a menu of options, this variation involves associating specific user input with specific symbol list options. For example, the function keys ("F1", "F2", etc.) provided as the top row of a standard PC-based keyboard may be associated respectively with the first data entry option, the second data entry option, etc. Upon detecting user input representing a symbol list option selection input, the symbol list option associated with the symbol list option selection input may be inserted at the data entry position. The insertion may be performed as part of an exemplary method embodying these techniques, e.g., as an additional element of the exemplary method 60 of FIG. 4. The insertion may also be performed by a system configured according to these techniques, e.g., by including in such a system (such as the exemplary system 90 of FIG. 6) a symbol list option selection input logic configured to associate at least one symbol list option with at least one symbol list option selection input, and by configuring the input processor component to detect user input comprising a symbol list option selection input and to insert the symbol list option associated with the symbol list option selection input at the data entry position. Those of ordinary skill in the art may be able to devise many variations in the association of symbol list options with symbol list option selection inputs while implementing the techniques described herein.

This fourth variation may be extended in various manners that may present even further advantages and/or reduce disadvantages with respect to other variations of these and other techniques. As one example, the symbol list may present the symbol list option selection inputs associated with the symbol list options. For example, in a visually presented symbol list, respective symbol list options may be listed along with the symbol list option selection inputs associated with the symbol list options. As one such example, in the implementation involving the association of function keys ("F1", "F2", etc.) with symbol list options, the symbol list may display the function key associated with each symbol list option in the displayed symbol list. Another such example is alluded to in the examples of FIGS. 5 and 8 by underlining the characters that the user may input to select one of the symbol list options, the symbolic semantic can be displayed as a tooltip for the symbol highlighted by the user. These variations may be included in methods embodying these techniques, e.g., by presenting the at least one symbol list option selection input associated with the at least symbol list option while presenting the symbol list. These embodiments may also be included in systems implemented according to these techniques, e.g., by configuring a symbol list presentation component of such a system to present the at least one symbol list option selection input associated with the at least one symbol list option.

An extension of this symbol list option selection mechanism that may be particularly advantageous involves the association of symbol list options with symbol list option selection inputs that comprise additional user input permitted by the grammar at the data entry position following the symbol. For instance, the user may select a symbol list option by typing a symbol that may naturally follow the symbol list being selected. The user may then select a symbol list option that has been completely or partially inputted by inputting a symbol that may validly follow the symbol or value associated with the symbol list option. Upon detecting such a symbol list option selection input, the data entry environment may insert the selected symbol or value at the data entry position, and may also insert the additional user input comprising the symbol list option selection input following the inserted symbol or value. This extension may be included in methods embodying these techniques by associating symbol list option selection inputs comprising additional user input that are permitted by the grammar at the data entry position following the symbol, and upon detecting such a symbol list option selection input, by inserting the additional user input after the selected symbol list option at the data entry position. This extension may also be included in systems implementing the techniques described herein, e.g., by configuring the symbol selection logic to associate symbol list options with symbol list option selection inputs comprising additional user input that are permitted by the grammar at the data entry position following the symbol, and by configuring the data entry insertion component to insert the additional user input after the selected symbol list option at the data entry position.

For example, in the third example 46 of FIG. 3, the user is typing a symbol beginning with the letters ab. According to the exemplary mathematical grammar 10 of FIG. 1, only one valid symbol may be inserted at this data entry position for this data set: the symbol abc referring to the previously assigned variable abc. The symbol may be validly followed by a whitespace character, such as a space (which may precede an operator or function name followed by another value or variable name) or a carriage return (which may terminate the expression.) Moreover, the insertion of a whitespace character at this data entry position does not comprise grammatically valid input, because no symbol ab exists in the data set or in the grammar. Accordingly, the whitespace characters (space and carriage return) may be provided as symbol list option selection inputs associated with the symbol abc. If the user inputs either a space or a carriage return at this data entry position while the symbol abc is focused in the list, then the data entry environment, in accordance with this extension of the fourth variation of this technique, may insert the remainder of the symbol associated with these symbol list option selection inputs (i.e., the c character completing the abc symbol), and may also insert the inputted whitespace character following the inserted symbol. In this manner, the data entry environment may facilitate grammatically correct user input by completing the grammatically valid symbol for this data entry position while also economizing user input.

This extended list option selection mechanism may be implemented in many ways. One such implementation involves an adaptation comprising a dynamic association of symbol list option selection inputs with symbol list options based on whether the symbol list includes a value option, i.e., based on whether or not a value comprises grammatically valid input at the data entry position. This implementation may be used to address the circumstance of an overeager symbol list generation system, e.g., where a large range of user input results in the presentation of symbol list option selection inputs than the user may expect. A potential result of this overeager symbol list is that the user may accidentally invoke the selection of a symbol list option through ordinary typing, which may produce the unintended insertion of symbols into the data set at the data entry position. This unintended invocation of the symbol list may impede data entry by providing a symbol list that is overly eager to insert unintended symbols, which are subsequently corrected by the user.

This scenario may be avoided by choosing the symbol list option selection inputs such that at least one symbol list option selection input is associated with a value option where a value option is included in the symbol list, and is associated with a symbol option where a value option is not included in the symbol list. For example, in a text-based data entry environment, a typical whitespace character (e.g., a space or carriage return) may be chosen as a symbol list option selection input associated with a symbol list option. When the grammar permits the insertion of a value at the data entry position, these whitespace characters may be associated with the value; and when the grammar does not permit the insertion of a value at the data entry position, these whitespace characters may be associated with a symbol option, such as a symbol commonly inserted in the symbolic context represented by the data entry position. This implementation may be advantageous by allowing users to more strongly associate the range of user input with the options of the symbol list where arbitrary values are not permitted, and by less strongly associating the range of user input with the options of the symbol list where arbitrary values are permitted as data entry. This adaptation may retain the utility of the symbol list while reducing the incidence of an accidental user selection of a symbol option in the symbol list when the user intended to enter a value.

For example, in the third example 126 of FIG. 8, the programming language grammar does not permit the insertion of a value at the data entry position; only a few existing symbols (string, static, etc.) may be validly inserted at the data entry position according to the programming language grammar. The symbol table for this third example 126 may therefore associate whitespace characters, such as space and carriage return, with one of these symbols (e.g., perhaps with the String symbol, which may be the most common symbol used in this symbolic context.) User input representing one of these symbol list option selection inputs may therefore be interpreted as the selection of the common symbol, and the symbol String may therefore be inserted at the data entry position. By contrast, in the fourth example 128 of FIG. 8, the grammar permits the insertion of a value at the data entry position based on at least two rules: to declare a new class member of type String, and to declare a new class function with return type String. Accordingly, the symbol table may associate the same whitespace characters with one of the value options instead of with a symbol option, such that ordinary user input may be less likely to invoke a symbol option that the user did not intend. Of course, other symbol list option selection inputs may be associated with the symbol options of the symbol list. For example, the Tab whitespace character may represent a less common user input in this symbolic context, and may be associated with a symbol option to permit the user to insert a grammatically valid symbol at the data entry position with less incidence of unintended selection. This adaptive association may reduce the incidence of unintended invocation of the symbol list option selection input mechanism, and may reduce the impedance of data entry through unintended symbol insertion. Those of ordinary skill in the art may be able to devise many variations in the adaptation of the symbol lists and the symbol list option selection inputs to various symbolic contexts while implementing the techniques described herein.

Still another variation on the use of symbol list option selection inputs comprises the presentation of a symbol list option selection input description with the symbol list that describes at least one symbol list option selection input and the at least one associated symbol list option. For example, in a particularly flexible grammar (such as a programming language), the symbol list may comprise a potentially long list of valid symbols and values that may be inserted at a data entry position, and a potentially large number of symbol list option selection inputs that may be invoked to insert various symbols and values at the data entry position. The completeness of the list may be cumbersome for the user to comprehend, especially where the user is quickly entering user input that moves the data entry position through several or many symbolic contexts in rapid succession.

This thorough but inefficient completeness may be alleviated by displaying (in addition to the symbol list, or with an abbreviated portion thereof) a general description of the symbols and values that may be inserted in the symbolic context of the data entry position, and the symbol list option selection inputs associated therewith. For example, in the fourth example 128 of FIG. 8, a symbol list may be presented that includes the several symbol list options and the symbol list option selection inputs associated with each symbol list option. Alternatively or additionally, the data entry environment may display a short message describing the valid input at this data entry position and the symbol list option selection inputs associated therewith. One such message that may be displayed for the data entry position in the fourth example 128 may read: "Input a class member or function name here followed by a space or carriage return; or press Tab to insert the String symbol here." The message comprises a symbol list option selection input description, and may be used to guide the user toward the valid user input options at the data entry position in an efficient manner. The symbol list option selection input descriptor might not convey all of the details of the symbol list, e.g., fewer than all symbol list options and fewer than all symbol list option completion inputs, but may instead provide a plain description of the small amount of information that the user may find useful. Those of ordinary skill in the art may be able to devise many variations in the description of the symbol list options and the symbol list option selection inputs while implementing the techniques described herein.

Another aspect of the symbol lists that may vary among implementations relates to the suggestion of a symbol list option by the data entry environment. For robust grammars such as programming languages, many symbol list options may be available for a particular data entry position. The symbol list may comprise several or even many symbol list options, and the user may have difficulty choosing among the various options efficiently when determining which symbols should be entered, thus impairing the utility of the symbol lists. However, this feature may not impair the user from using the list for validating the symbol or value that the user may already know they want to enter. Further, many of the symbol list options may be unusual, uncommon, specialized, and/or not preferred for the symbolic context of a data entry position; i.e., while the grammar may permit many symbol list options for a data entry position, many of them may be undesirable.

As a supplemental guide to the symbol list, the data entry environment may choose to suggest a symbol list option to the user that is common, preferred, and/or particularly suitable for the symbolic context of the data entry position. The suggested symbol list option may be presented in a different manner other than the other symbol list options in the symbol list. For example, the symbol list may be sorted with the suggested symbol list option as the first symbol list option in the symbol list to indicate its status. By extension, the symbol list options may be ranked according to suggested preference, and the list may be sorted with higher-ranked suggested symbol list options before lower-ranked suggested symbol list options. As other examples, for visually presented symbol lists, the suggested symbol list option may be highlighted, shown in a different color, shown with a different font or font style or size, etc.; and for audibly presented symbol lists, the suggested symbol list option may be presented with an audible cue, such as a distinctive tone that plays before the suggested symbol list option is audibly presented. The symbol list may also include a suggested symbol list option description, which describes the suggested symbol list option and/or its preference in the symbolic context of the data entry position (e.g., "exception is a suggested and common name value for this object of type Exception.") Those of ordinary skill in the art may be able to devise many variations in the presentation of the suggested symbol list option(s) while implementing the techniques described herein.

The designation and presentation of one or more suggested symbol list options in the symbol list may also affect the user interaction with the symbol list in various ways. As one example, a symbol list option selection input may be designated as suggested symbol list option selection inputs, and upon detecting user input representing a suggested symbol list option selection input, the symbol list may insert the selected symbol list option of the symbol list at the data entry position. For example, the symbol lists may associate the Tab key with the selection of the suggested symbol list option in any symbol list. As another example, the data entry environment may allow the user to focus on a symbol list option, e.g., by hovering over a displayed symbol list option with a pointing device such as a mouse or stylus, or by cursoring to a displayed symbol list option with the arrow keys of the keyboard. Such focusing may indicate user interest in the symbol list option prior to the user selection of any symbol list option, and may prompt the symbol list to provide more information about the focused symbol list option. Accordingly, the symbol list may update the symbol list to suggest the focused symbol list option, and may optionally update the suggested symbol list option description to describe the focused symbol list option. Many variations in the user interaction with the symbol list in view of one or more suggested symbol list options may be devised by those of ordinary skill in the art while implementing the techniques described herein.

Still another technique for improving the efficiency of the symbol lists relates to the filtering of the symbol list to restrict the included symbol list options to a more desirable subset of grammatically valid symbols and values. As one example, the symbol list may include a selectable common symbol list option filter that, upon user toggling, presents or hides some of the symbol list options of the symbol list. For example, the symbol list may be toggled to show or hide the symbol list options that are grammatically valid for the symbolic context of the data entry position, but that are uncommon, specialized, or unsuitable. In one embodiment of this technique, the symbol list may include a "Show All" checkbox that the user may toggle to show all or only some of the grammatically valid symbols and values. The symbol list may therefore be configured present to the user only the symbol list options that the user is likely to select, or the complete list of grammatically valid symbols for the data entry position. As another example, the symbol list may include only the options that the user has previously and frequently selected for the symbolic context of the data entry position, while providing a toggle to show the complete list of grammatically valid symbols and values for the data entry position. Many variations in the filtering of the symbol list and the user selection thereof may be devised by those of ordinary skill in the art while implementing the techniques described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of facilitating data entry at a data entry position in a data set within a data entry environment having a symbolic grammar on a computer having a processor, the method comprising:
executing on the processor instructions configured to:
if the grammar permits a currently undefined symbol name at the data entry position, select a new symbol name that is not currently assigned to any member of any object associated with the data entry position; and
present a symbol list having symbol list options comprising:
symbol options permitted by the grammar at the data entry position, and
a new symbol name option for the new symbol name;
upon receiving from the user a selection of the new symbol name option, assign the new symbol name to a new object; and
the new object having an object type selected from an object type set comprising: a variable; a class; a class member; and a function.

2. The method of claim 1, wherein:
the symbol list option selection inputs comprising additional user input that are permitted by the grammar at the data entry position following the symbol, and
the inserting comprising inserting the additional user input after the selected symbol list option at the data entry position.

3. The method of claim 1, wherein the symbol list further comprises at least one symbol list option selection input associated with a new symbol name option where a new symbol name option is included in the symbol list, and associated with a symbol option where a new symbol name option is not included in the symbol list.

4. The method of claim 1, wherein the symbol list further comprises a symbol list option selection input description that described at least one symbol list option selection input and the at least one associated symbol list option.

5. The method of claim 1, wherein the symbol list further comprises a suggested symbol list option presented in a different manner than other symbol list options in the symbol list.

6. The method of claim 5, the suggested symbol list option comprising the new symbol name option where the new symbol name option is included in the symbol list.

7. The method of claim 5, comprising:
detecting user input representing a suggested symbol list option selection input; and upon detecting the suggested symbol list option selection input, inserting the suggested symbol list option at the data entry position.

8. The method of claim 5, the symbol list including a suggested symbol list option description describing the suggested symbol list option.

9. The method of claim 8, comprising: upon detecting user input representing a focusing on a symbol list option, updating the symbol list to suggest the focused symbol list option, and including a suggested symbol list option description describing the suggested symbol list option.

10. The method of claim 1, wherein the symbol list further comprises a selectable common symbol list option filter that, upon user selection of the common symbol object filter, removes from the symbol list the symbol list options that are not commonly selected at the data entry position.

11. A system for facilitating data entry at a data entry position in a data set within a data entry environment having a symbolic grammar on a computer having a memory and a processor, the system comprising:
a data entry position grammar logic component configured to identify symbols permitted by the grammar at the data entry position and to determine whether a a currently undefined symbol name is permitted by the grammar at the data entry position; and a symbol list presentation component configured to:
if the grammar as determined by the data entry grammar analysis component permits a currently undefined symbol name at the data entry position, select a symbol name that is not currently assigned to any member of any object associated with the data entry position; and
present a symbol list having symbol list options comprising:
symbol options permitted by the grammar at the data entry position as determined by the data entry grammar analysis component, and
a new symbol name option for the new symbol name; and
an input processor component configured to detect user input representing a user selection of a symbol list option, and
a data entry insertion component configured to insert the selected symbol list option detected by the input processor component at the data entry position.

12. The system of claim 11, comprising:
a symbol list option selection input logic component configured to associate at least one symbol list option with at least one symbol list option selection input,
the input processor component configured to detect user input comprising a symbol list option selection input and to insert the symbol list option associated with the symbol list option selection input at the data entry position.

13. A method of facilitating data entry at a data entry position in a data set within a data entry environment having a symbolic grammar on a computer having a processor, the method comprising:
identifying symbols permitted by the grammar at the data entry position and to determine whether a currently undefined symbol name is permitted by the grammar at the data entry position;
if the grammar permits a currently undefined symbol name at the data entry position, selecting a new symbol name that is not currently assigned to any member of any object associated with the data entry position;
presenting a symbol list having symbol list options comprising:
symbol options permitted by the grammar at the data entry position, and
a new symbol name option for the new symbol name;
detecting user input representing a user selection of a symbol list option; and
inserting the selected symbol list option detected by the input processor component at the data entry position.

14. The system of claim 11, wherein the symbol list further comprises at least one symbol list option selection input associated with a new symbol name option where a new symbol name option is included in the symbol list, and associated with a symbol option where a new symbol name option is not included in the symbol list.

15. The system of claim 11, wherein the symbol list further comprises a symbol list option selection input description that describes at least one symbol list option selection input and the at least one associated symbol list option.

16. The system of claim 11, wherein the symbol list further comprises a suggested symbol list option presented in a different manner than other symbol list options in the symbol list.

17. The system of claim 11, wherein the symbol list further comprise a suggested symbol list option comprising the new symbol name option where the new symbol name option is included in the symbol list.

18. The system of claim 17, wherein the symbol list presentation component is further configured to:
- detect user input representing suggested symbol list option selection input; and
- upon detecting the suggested symbol list option selection input, insert the suggested symbol list option at the data entry position.

19. The system of claim 17, wherein the symbol list further comprises a suggested symbol list option description describing the suggested symbol list option.

20. The system of claim 19, wherein the symbol list presentation component is further configured to, upon detecting user input representing a focusing on a symbol list option, update the symbol list to suggest the focused symbol list option, and including a suggested symbol list option description describing the suggested symbol list option.

21. The system of claim 11, wherein the symbol list further comprises a selectable common symbol list option filter that, upon user selection of the common symbol object filter, removes from the symbol list the symbol list options that are not commonly selected at the data entry position.

* * * * *